United States Patent [19]

Harms

[11] Patent Number: 4,873,817

[45] Date of Patent: Oct. 17, 1989

[54] ELECTRICALLY CONTROLLED PRESSURE RELIEF VALVE SYSTEM AND METHOD

[75] Inventor: Louis C. Harms, Evanston, Ill.

[73] Assignee: United Technologies Automotive, Inc., Dearborn, Mich.

[21] Appl. No.: 226,658

[22] Filed: Aug. 1, 1988

[51] Int. Cl.$^4$ .................... A01D 47/00; A01D 75/28; F16K 31/06; F16K 31/122

[52] U.S. Cl. ............... 56/10.2; 56/DIG. 15; 137/491; 251/30.02

[58] Field of Search ........... 251/30.01, 129.15, 129.01, 251/30.02, 30.05, 43; 137/117, 504, 538, 540, 543.19, 625.64, 491, 489; 56/10.2, 10.8, 10.9, DIG. 15, DIG. 10; 364/424.05

[56] References Cited

U.S. PATENT DOCUMENTS

| | | | |
|---|---|---|---|
| Re. 32,644 | 4/1988 | Brundage et al. | 251/30.01 |
| 3,114,532 | 12/1963 | Gray et al. | 251/30 |
| 3,250,294 | 5/1966 | Hipple | 137/528 |
| 3,460,081 | 8/1969 | Tillman | 335/234 |
| 3,667,722 | 6/1972 | Katz et al. | 251/30 |
| 3,727,630 | 4/1973 | McInnis | 137/218 |
| 3,788,597 | 1/1974 | Ichioka | 251/129 |
| 4,206,781 | 6/1980 | Salter | 137/504 |
| 4,229,931 | 10/1980 | Schlueter et al. | 56/10.2 |
| 4,236,690 | 12/1980 | Smilges et al. | 251/30 |
| 4,305,566 | 12/1981 | Grawunde | 251/30 |
| 4,335,561 | 6/1982 | Swanson et al. | 56/10.2 |
| 4,429,708 | 2/1984 | Strueh | 137/117 |
| 4,452,424 | 6/1984 | Kawata | 251/129 |
| 4,456,170 | 6/1984 | Weigle et al. | 137/491 X |
| 4,478,245 | 10/1984 | Bender | 137/554 |
| 4,531,707 | 7/1985 | Dotti et al. | 251/30.01 X |
| 4,573,124 | 2/1986 | Seiferling | 56/10.2 X |
| 4,741,364 | 5/1988 | Stoss et al. | 137/625.6 X |
| 4,776,153 | 10/1988 | DePauw et al. | 56/10.2 |

*Primary Examiner*—Stephen J. Novosad

[57] ABSTRACT

An electrically controlled, proportional, pressure relief valve (100/200) used to control the maximum allowable pressure in a hydraulic line (3), whose pressure is used to control, for example, the relative up-and-down positioning and speed of movement of a combine header (1) on an agricultural combine, in which the effective maximum pressure of the pilot valve of the relief valve is controlled by a solenoid (113/213). The distal tip of the armature (114/214) of the solenoid bears against a movement and force translating drive pin (112/212), which in turn bears against a ball (110; FIG. 2) or a poppet pin (210; FIG. 3). The effective maximum pressure permitted by the relief valve is linearly varied by the applied voltage/current to the solenoid coil (115/215). Such an arrangement allows the electrically controlled pressure relief valve to be easily interfaced and controlled by, for example, a computer (20) with a condition responsive input/output section (21), greatly expanding the possible applications for the pressure relief valve system of the invention. In the preferred application (FIG. 1), the movement of a ground contacting ski sled (22) carried by the combine ("C") is monitored by the computer, which then sends electrical signals to the pressure relief valve, which in response to the electrical signals controls the pressure level in the hydraulic line to the ram moving the combine header, determining its vertical position and the speed with which the header moves, as it goes from one vertical position to the other with respect to the ground.

11 Claims, 3 Drawing Sheets

ELECTRICALLY CONTROLLED PRESSURE RELIEF VALVE SYSTEM AND METHOD

TECHNICAL FIELD

This invention relates to systems using proportional, pressure relief valves to control, and allow the varying of, the maximum pressure in a fluid line, such as, for example, a hydraulic line. More particularly, the present invention relates to such a system in which the pressure relief valve is a pilot type valve, and even more particularly to one whose action is electrically controlled.

Still more particularly, the present invention relates to the art of electrically controlled fluid pressure line systems, in which the pressure in the line effects some desired change in an external condition and in which the effective maximum line pressure can be varied under an electrical control, preferably with a linear relationship and which preferably can be easily interfaced with computer operated controls. An exemplary application is the control of the up-and-down relative positioning of a combine header on an agricultural combine, and the acceleration and deceleration of the movement of the header as its vertical position is being changed by the system, although many other, substantially different applications are possible.

BACKGROUND ART

In the prior art of proportional pressure relief valves it is known to use a pilot type valve to control and vary the maximum pressure allowed in a fluid line. In such pressure relief valves, a spring is used to bias a pilot valve closed, the effective applied force of the spring being variable to vary the effective maximum pressure the pressure relief valve allows to exist in the fluid line with which it is being used.

However, heretofore, most, if not all, such pressure relief valves have utilized some form of manual or mechanical control, in which, for example, a rotatable, threaded member was used to vary the spring tension on the pilot valve and hence the pressure level in the system. Such a manual or mechanical approach greatly limits the possible applications in which such pressure relief valves could be used.

In contrast, in the present invention a pressure relief valve has been designed in which the action of the pilot valve is electrically controlled, allowing such a valve to be used in systems which can effectively use, for example, computer based controls, greatly expanding the possible applications for such a system.

DISCLOSURE OF INVENTION

Thus, the present invention is directed to a pressure relief valve system, in which the maximum allowed system pressure is electrically controlled, using a system which causes the maximum allowed pressure to be adjusted in response to an electrical control signal, preferably one in which the relationship between the two is a linear one. More particularly the present invention is directed to such a system which preferably is computer controlled.

One particularly efficacious way of achieving this is to use a solenoid control on the pilot valve of the pressure relief valve system, in which the movement of the solenoid armature preferably is directly translated to vary the resistive or retarding pressure on a rounded or contoured pilot member in its seat. One example of a rounded pilot member is a poppet ball, against which an intermediate pin driven by the armature is placed. Another example is one in which the ball and pin are at least in part effectively combined into a single, integrated structure in the form of a poppet pin having a conical or hemispheric terminal end distal to the solenoid armature, with the proximal end of the poppet pin being in contact either directly, or through a further drive pin or shaft, with the armature for common movement therewith.

Such approaches produce a relatively inexpensive, reliable control system, which is electrically controlled with a linear relationship and can be easily interfaced with a computer control sub-system with an input/output stage that can be condition responsive or directly controlled by the user or be otherwise programmed.

A particularly efficacious application is in the positioning and speed of movement of a combine header in an agricultural combine, in which, for example, the movement of a ski sled moving along the ground is a condition to which a computer responds and sends an electrical signal to the solenoid of the electrically controlled proportional, pressure relief valve controlling the maximum pressure level in the hydraulic line used to position the combine header. The particular maximum pressure level allowed in the line by the pressure relief valve then, in turns, determines the direction and speed of movement of the combine head, having the combine head thus be smoothly moved with controlled movement to follow the ground contour being sensed by the ski sled.

Such a controlled combine header system provides a very smooth header action, allowing the combine to move faster, in contrast to the jarring, up-and-down action of the combine header control systems of the prior art. This in effect puts "more beans in the bin" for the combine.

The foregoing and other features and advantages of the present invention will become more apparent from the following further description and drawings.

BRIEF DESCRIPTION OF DRAWINGS

FIG. 2 is a side, cross-sectional, partial view of a first exemplary embodiment for the proportional, pressure relief valve element for the system of the present invention, with the structure surrounding the valve element being cut away; while

FIG. 4A is a graph of the set maximum allowed pressure (in PSI, going from 0 to 3000) versus flow rate [in gallons per minute (GPM)] occurring at different voltage levels (2.7, 5.0 and 8 volts) to the solenoid for the pressure relief valve element of FIG. 2; while

MODES FOR CARRYING OUT THE INVENTION

Figure 1:
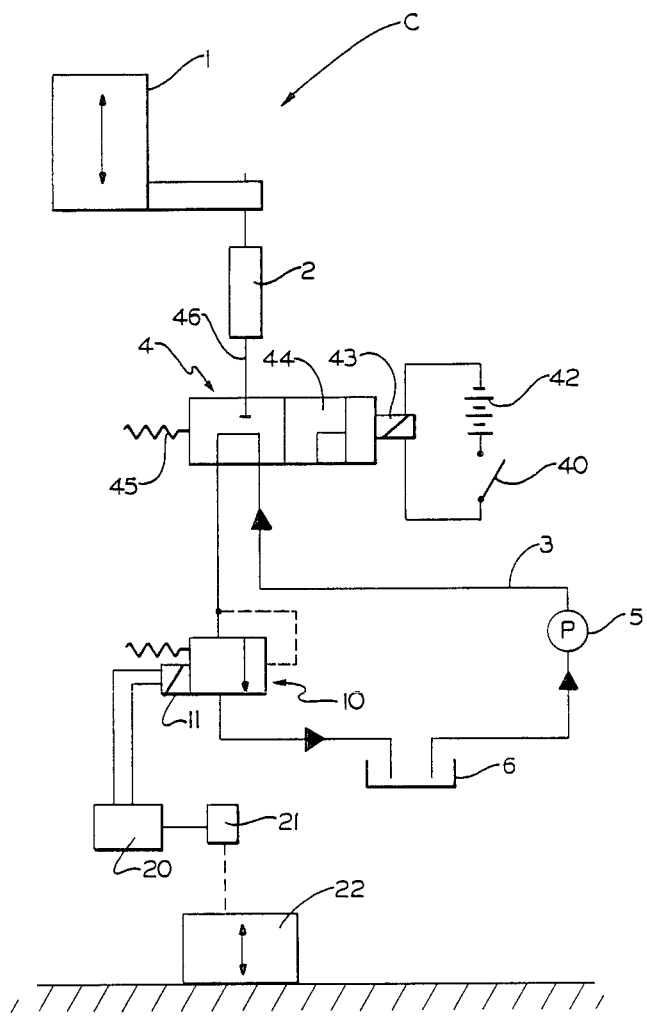
FIG. 1 is a generalized, schematic view of the preferred, exemplary embodiment of the electrically controlled pressure relief valve system of the present invention, as applied to an agricultural combine and more particularly to the hydraulic line for the lift cylinder or ram of the combine header, as an exemplary but very efficacious application for the present invention. Standard hydraulic or fluidics symbolism is used in the figure.

An exemplary application of the system of the present invention is illustrated in generalized, schematic form in FIG. 1, as applied to, for example, an agricultural combine "C", in which the up-and-down position and the speed of movement of the combine header 1 is controlled by a hydraulic lift cylinder or ram 2. The ram 2 is gravity lowered and driven by the hydraulic line pressure in line 3, when the two-position/three-way solenoid valve 4, which serves as an "on/off" valve, is opened.

In the disposition shown in FIG. 1, the solenoid valve 4 is closed. When the switch 40 is closed by the combine operator, electrical power is applied from the electrical power source 42 to the solenoid 43. This causes the valve element 44 to be moved to the left against the biasing action of the spring 45, which in turn connects the hydraulic power line 46 for the ram 2 to the pressure of the line 3.

The hydraulic line pressure of line 3 then drives the lift cylinder 2, raising the combine up to a higher vertical level with a speed of movement determined by the fluid pressure which exists in the line 3. In turn the hydraulic pressure in line 3 is created by the hydraulic pump 5 working in conjunction with a reservoir or tank 6.

The effective level of the line pressure at any particular point in time in the line 3 is controlled by the pressure relief valve 10, which in turn, as will be explained more fully below, is determined by the pilot control solenoid element 11, acting under the control of the computer sub-system 20 having an input/output ("I/O") stage or section 21.

The input part of the "I/O" section 21 can be in the form of, as illustrated, a condition responsive sub-system, which more particularly, for this specific application, is in the form of a ski sled 22, which is carried by the combine "C" in contact with the ground. The vertical position of the ski sled 22 at each particular point in time is sensed by the input stage of the I/O section 21, and its position variations, which are a function of the changing ground contour and the ground speed of the combine "C", are interpreted by the computer 20, which in turn sends the appropriate electrical signals to the solenoid 11 of the pressure relief valve 10.

The relative direction of movement of the combine header 1, either up or down, and its speed of movement, is controlled by the combined action of the hydraulic ram 2 and gravity. The amount of lift and how fast the ram 2 moves the header, that is, its acceleration and deceleration, is determined by the pressure level present at any particular point in time in the hydraulic line 3. In turn, as explained more fully below, the pressure in the hydraulic line 3 is determined by the proportional, pressure relief valve 10 and the electrical signals to its solenoid 11 as determined by the computer 20, which is appropriately powered and programmed.

Thus, the ski sled 22 serves as a ground contour sensing means associated with the combine "C" and in essence measures the changing contour of the ground over which the combine travels, as the combine travels over the ground, and is being operatively used to, for example, harvest a crop. The computer sub-system 20 in turn interprets the output of the ground sensing ski sled 22 and controls the electrical signals to be sent to the solenoid 11, appropriately changing the set maximum allowed pressure allowed in the inlet line 3, appropriately moving the combine header 1 in response thereto.

If desired, the I/O stage 21 could include a console display for the operator, indicating the position and speed of movement of the combine header as it is being moved by the hydraulic ram 2.

The details of the computer subsystem 20 and its I/O section 21 form no part of the invention, and, in this "age of the computer," many appropriate systems are readily available to the art, including various microprocessors to provide the analog electrical signals, which typically range from a tenth of an amp to a half of an amp, to the valve 10.

Figure 2:
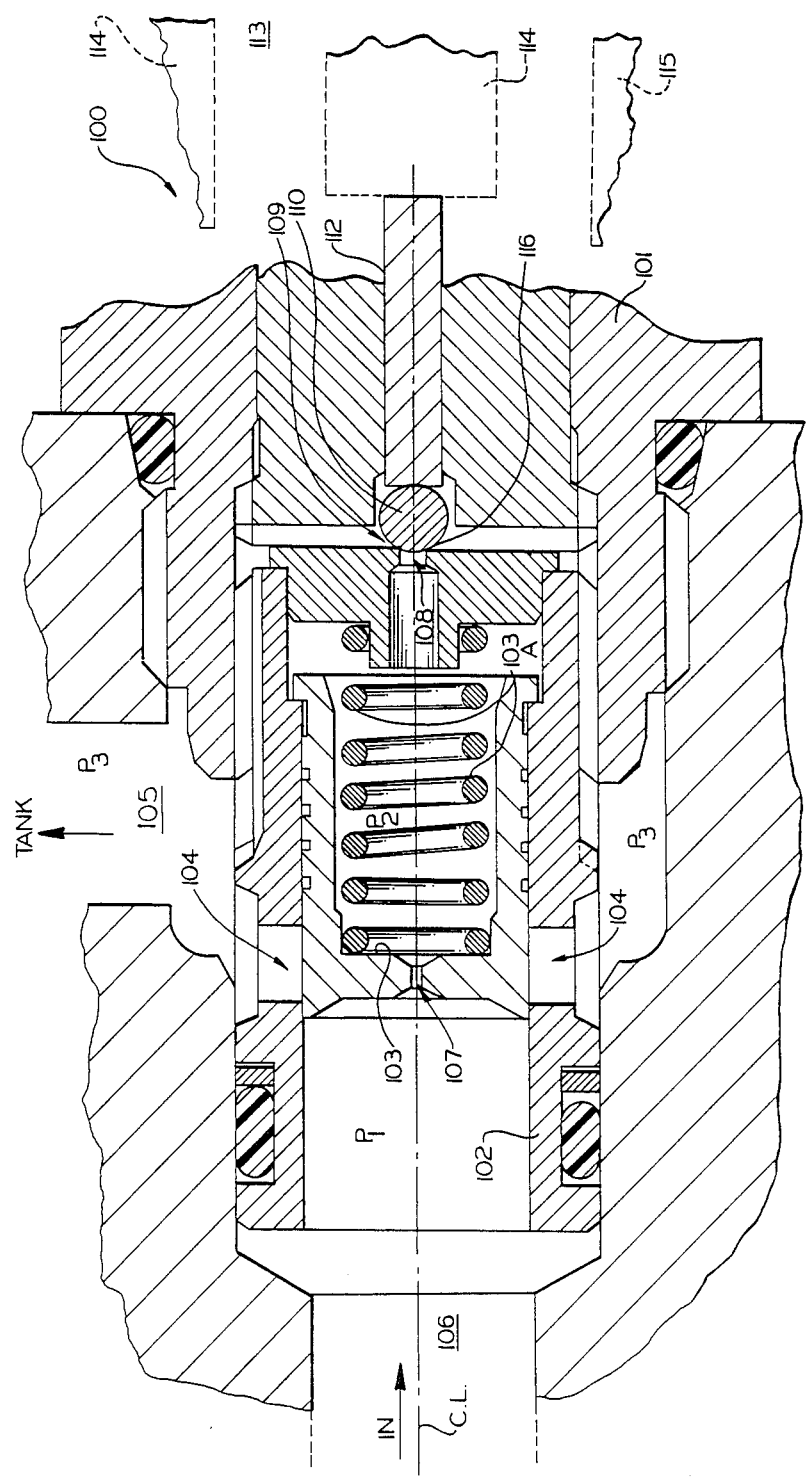

A first exemplary embodiment of an electrically controlled proportional, pressure relief valve suitable for use in the system of the present invention is illustrated in FIG. 2. As can be seen in that figure, the pressure relief valve 100 has a screw-in, threaded cartridge 101, which is threadably engaged with the wall of the structure to which it is applied, so that the valve is situated between an inlet line 106 and a tank line 105, which goes to the hydraulic tank or reservoir 6 of the hydraulic circuit.

The cartridge 101 holds a cage 102, which in turn is positioned in the forward end of the cavity formed within the structure. Within the cage 102, there is included a longitudinally movable, centrally open, pilot spool 103, which is biased by a spring 103A to a forward position, where it blocks off a direct port 104 from inlet line 106 to the tank 6 via the tank line 105.

The fluid in the inlet 106 at pressure $P_1$ is metered to pressure $P_2$ within the pilot spool 103 through a small orifice 107. Under the appropriate pressure and electrical conditions, explained more fully below, fluid flows from the $P_2$ area out the open back of the pilot spool 103 through the back portion 108 of the cage 102 and through an orifice 109 controlled by a ball 110, and then to the tank through the tank line 105. This occurs when the inlet pressure $P_1$ is at or above the designed initiating pressure, and the control resisting pressure on the ball 110 is not set to effectively close the orifice 109.

Figure 3:
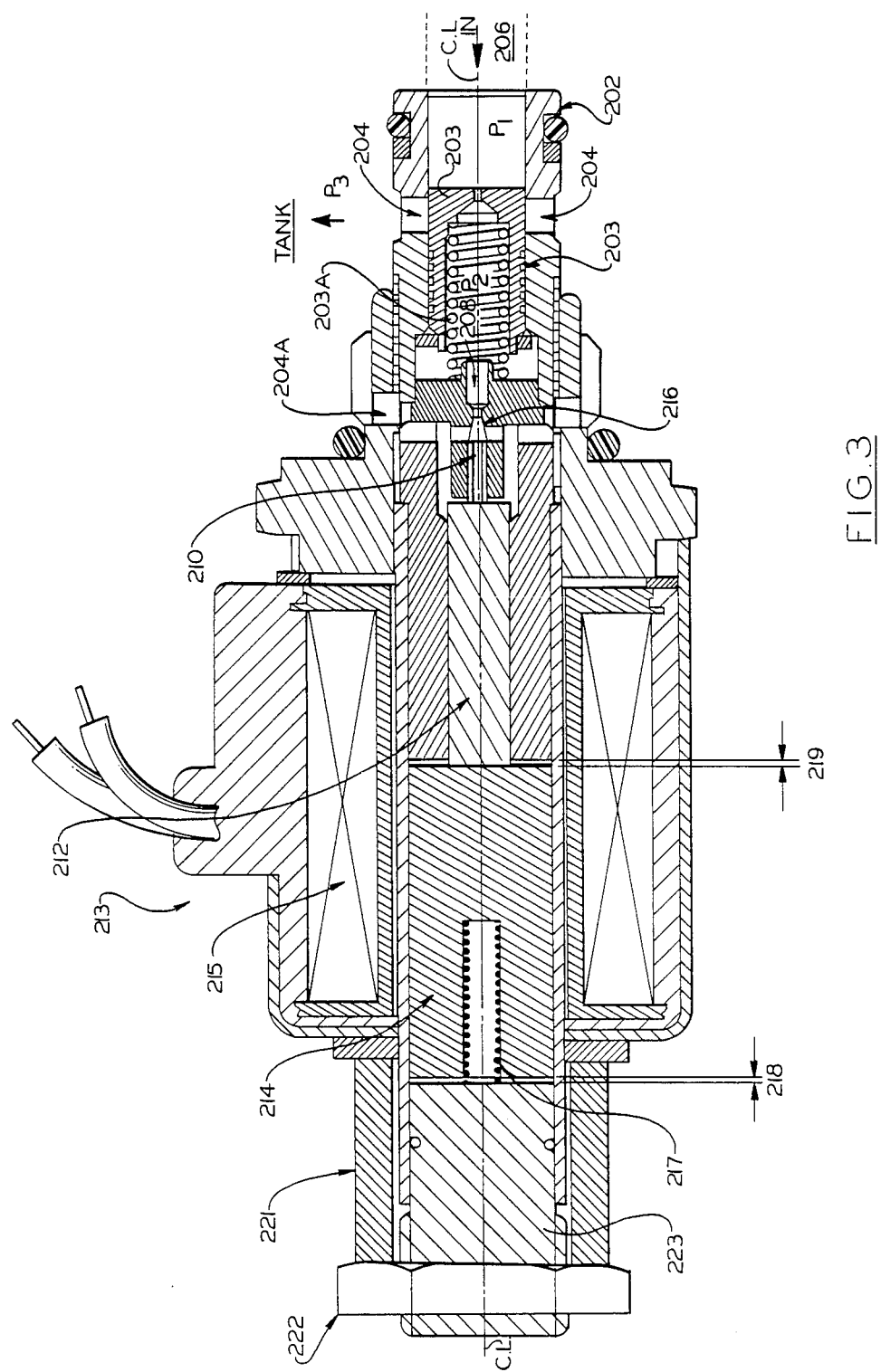
FIG. 3 is a side, cross-sectional, complete view, similar to that of FIG. 2, but from the opposite side and of a second exemplary embodiment of the proportional, pressure relief valve element for the system of the present invention with none of the surrounding structure shown.

The pressure required to unseat the ball 110 and allow flow is the minimum desired initiating pressure and is initially determined by the resistive force upon the ball applied by a biasing spring (not illustrated for this embodiment, but note spring 217 in the embodiment of FIG. 3). When the inlet fluid at 106 is at a pressure below the desired pressure, there will be no fluid flow, and the ball 110 will remain seated, closing off the orifice 109, and there is no movement of the pilot spool 103.

When the pressure of the inlet fluid at 106 reaches or rises above the desired initiating pressure, not only will the ball 110 open, allowing the fluid to pass through the cage 102 and out the orifice 109 to the tank, but the pilot spool 103 will be displaced, allowing fluid to flow directly from the $P_1$ area to the relative low $P_3$ pressure area through the tank port 104. The relatively low tank pressure $P_3$ is typically at, for example, about ten pounds-per-square-inch (psi)

Appropriate "0" ring seals are included to insure fluid tight seals between all of the various, individual parts.

This is all believed to be known in the prior art of proportional, pressure relief valves. A proportional, resistive force, as is generally indicated in FIG. 2, is applied to a shaft or pin 112 contacting the ball 110, tending to keep the ball seated. Typically, in the prior art, this force has been solely that of a spring, whose effective resistive force was adjusted by threadably tightening a retainer holding the spring (not illustrated).

However, in contrast to this purely mechanical, prior art approach, an electric solenoid 113 (shown generally in phantom line in FIG. 2) is used in this embodiment of the invention to drive an armature 114 (likewise shown generally in phantom line) contacting the shaft or pin 112, which in turn is contacting the ball 110. In this manner, by varying the voltage applied to the coil 115 and hence the current going through it, the effective force or pressure applied to the ball to maintain it against the seat 116 is varied.

Figure 4A:
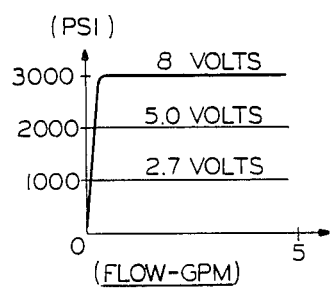
Figure 4B:
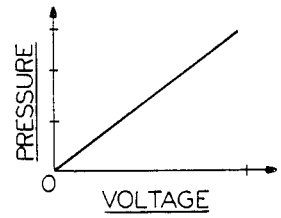
FIG. 4B is a graph of the resultant maximum allowed pressure versus the voltage to the solenoid coil of the pressure relief valve of FIG. 2, showing the linear relationship between the two.

As a consequence of this force or pressure being varied, the pressure required to unseat the ball 110 to allow fluid to flow is likewise varied, with there being a linear relationship between the effective, allowable maximum pressure and the voltage or current going to the solenoid coil 115, as graphically illustrated in FIG. 4B.

By appropriate electrical control of the solenoid 113, the valve 100 may be used as a proportional, pressure relief valve for regulating the maximum allowed pressure permitted at any particular point in time in the hydraulic line 106, depending upon the resistive pressure applied to the ball 110. Hence, the valve 100 serves as a proportional, pressure relief or pressure regulation valve under electric control. As such, it is not concerned with the amount of fluid flow within the line 106, but only with regulating the maximum allowed pressure which can exit in the line 106 before it is directly connected back to the tank through port 104. The port 104 is at a relatively low pressure, and thereby relieves the relatively high pressure in the inlet line when the port 104 is opened by the movement of the pilot spool 103.

A second, similar embodiment suitable for the proportional, pressure relief element 10 of the system of the present invention is illustrated in FIG. 3, where the primary difference is that the ball 110 of FIG. 2 has been replaced by a poppet pin 210, which engages its seat with, for example, a conical, mating interface at its distal tip.

Because of the clear similarities between the two embodiments, a complete, detailed description of all of the elements of the proportional, pressure relief valve of FIG. 3 is considered unnecessary, it being noted that like parts between the two embodiments are given like reference numbers.

However, it is noted that additional, exemplary details, not shown in the partial view of the first embodiment, are provided at the exterior end of the solenoid controlled pressure relief valve 200. As can be seen on the left side of FIG. 3, which is taken from the opposite side than that of the side view of the first embodiment (FIG. 2), the exterior end of the valve includes the initial biasing spring 217, which provides the initial, biasing-closed force on the poppet pin 210. This determines the initial force which the pressure $P_1$ must overcome before there is any flow through the orifice 208 past the poppet pin 210 past its mating conical seat 216, and movement of the pilot spool 203 begins.

When the solenoid 213 is actuated by current flow through the coil 215, additional resistive, closing force is applied against the poppet pin 210 toward its seat 216, as the armature 214 moves against the drive pin or shaft 212, which in turn bears against the proximal end of the poppet pin.

When fluid begins to move past the head of the poppet pin 210, it flows out to the tank through supplemental tank orifice 204A. When the inlet pressure rises to the preset maximum, the pilot spool 203 moves, exposing any increasing pressure to the dissipating low pressure of the tank.

As can be seen in the figure, the poppet pin 210 is allowed to move only a short distance (note poppet pin lift dimension 218), and a magnetic air gap 219 is also provided at the exterior end of the sleeve 220, between it and the armature 214. A spacer 221, nut 222 and poppet pin lift adjustment element 223 complete the exterior end assembly of the pressure relief valve 200.

An exemplary size for the orifice 107/207 is seven-hundredths of an inch in diameter, which would provide about a fifty psi pressure drop, which in combination with the biasing spring (e.g. 217), could provide a designed initiating pressure of, for example, five hundred psi. As the solenoid 113/213 is actuated and its current/voltage is increased, the maximum allowed pressure can be continuously increased to any desired set point, up to, for example, about a thousand psi or even about three thousand psi or more, if desired.

The flow rate of the hydraulic fluid in line 3 and its varying pressure levels due to the input voltage to the solenoid coil 113 is graphically illustrated in FIG. 4A, while FIG. 4B shows the linearly increasing relationship between the set maximum pressure level allowed in line 3 based on the coil's input voltage.

It is noted that for both the embodiments 100/200 of FIGS. 2 and 3, most of the elements thereof are of general cylindrical shape or are formed of cylindrical sections, each of which is symmetrical about a three hundred and eighty degree sweep about its center-line "C.L.".

Although this invention has been shown and described with respect to detailed, exemplary embodiments thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

I claim:

1. An electrically controlled pressure relief valve system for varying the maximum allowable line pressure in as associated fluid line in response to an electrical signal, comprising:
   an inlet line for containing fluid under pressure;
   a tank line leading to a fluid tank at a relatively low pressure to that normally contained in said inlet line;
   a proportional, pressure relief valve located in line between said inlet line and said tank line, blocking the two off when a relatively low pressure exists in said inlet line, said pressure relief valve including
   a cartridge,
   a longitudinally extended cage held by said cartridge and associated with said inlet line,
   a longitudinally movably, centrally open pilot spool located within said cage and in fluid communication with said inlet line, said spool having a front orifice associated with the centrally open area of said spool and communicating with said inlet line and having a substantially smaller cross-sectional area than the most adjacent part of said inlet line, causing a pressure drop across said spool as fluid passes through said orifice from said inlet line, and said cage having a back orifice associated with said centrally open area through which fluid can flow under certain pressure conditions to said tank line, a valve element seat surrounding said back orifice, a longitudinally movable valve element associated with said seat tending to close off said back orifice tending to prevent fluid flow through it, and biasing spring means associated with said movable valve element for applying an initial, minimum resistive biasing force against said valve element tending to keep it seated in said seat;

a direct, side port leading from said inlet line to said tank, said port having a cross-sectional area substantially greater than said front orifice and being located in juxtaposition to the side of said pilot spool and being normally blocked off by said spool under the action of said biasing spring at least until the pressure in said inlet line at least equals the resistive biasing force but, as the inlet pressure increases, said pilot spool tending to allow fluid to flow from said inlet line through said front orifice to said centrally open area through said back orifice overcoming the biasing force of said spring to said tank, upon which said spool begins to move back until it exposes said port to said inlet line, causing the relatively high pressure of said inlet line to be limited by the relatively low pressure in said tank line;

electrical means associated with said valve element for applying a supplemental resistive force to it, increasing the resistive pressure upon it over the initial, biasing spring force, further tending to keep said valve element seated, closing off any fluid flow through said back orifice;

electrical signal means associated with said electrical means for varying the amount of resistive force applied by said electrical means to said valve element, allowing the maximum allowed pressure allowed in said inlet line before its is exhausted to said tank line to be variously set by utilizing said electrical signal; and work means associated with said inlet line, which work means is caused to do desirable work at a rate set in accordance with the varying set maximum pressure levels in said inlet line, said electrical signal means effectively controlling said work means in accordance with the electrical signal produced by said electrical signal means.

2. The electrically controlled pressure relief valve system of claim 1, wherein said work means comprises:

an agricultural combine;

a combine header carried by said combine;

an hydraulic circuit associated with said inlet line, said tank line and said pressure relief valve;

hydraulic lift means included in said circuit and connected to said header for moving said combine header to a vertical position off of the ground and at a speed dependent upon the hydraulic pressure existent in said inlet line;

ground contour sensing means associated with said combine measuring the changing contour of the ground over which said combine travels as the combine travels over the ground and is being operatively used; and computer means associated with said combine for interpreting the output of said ground sensing means and controlling said electrical signal means producing appropriate electrical signals to be sent to said electrical means appropriately changing the set maximum allowed pressure allowed in said inlet line, appropriately moving said combine header in response thereto.

3. The combine with electrically controlled pressure relief valve system of claim 2, wherein:

said ground contour sensing means is a ski sled carried by said combine in contact with the ground.

4. The combine with electrically controlled pressure relief valve system of claim 2, wherein there is further included:

a gravity lowered hydraulic ram connected to said combine head; and a two-position/three-way solenoid valve connected between said hydraulic ram and said inlet line controlling the hydraulic fluid pressure supplied to said ram controlling its direction and speed of movement in conjunction with said pressure relief valve.

5. The electrically controlled pressure relief valve system of claim 1, wherein:

said electrical means is a solenoid having a coil and a centrally located, longitudinally movable armature located within said coil, the longitudinal movement of said armature resulting when said coil has current flowing through it and being transferred to said moveable valve element, providing said supplemental resistive force.

6. The electrically controlled pressure relief valve system of claim 1, wherein:

said movable valve element is a poppet ball.

7. The electrically controlled pressure relief valve system of claim 1, wherein:

said movable valve element is a poppet pin having a distal end which is curved and contoured to fit said seat.

8. The electrically controlled pressure relief valve system of claim 1, wherein:

said electrical means varies the set maximum allowed pressure in a linearly increasing relationship with the voltage applied to said electrical means.

9. An agricultural combine with an electrically controlled pressure relief valve system for varying the maximum allowable line pressure in an associated hydraulic fluid line in response to an electrical signal, comprising:

an inlet line for containing hydraulic fluid under pressure;

a tank line leading to a hydraulic fluid tank at a relatively low pressure to that normally contained in said inlet line;

a proportional, pressure relief valve located in line between said inlet line and said tank line, blocking the two off when a relatively low pressure exists in said inlet line, said pressure relief valve including a cartridge, a longitudinally extended cage held by said cartridge and associated with said inlet line, a longitudinally movably, centrally open pilot spool located within said cage and in fluid communication with said inlet line, said spool having a front orifice associated with the centrally open area of said spool and communicating with said inlet line and having a substantially smaller cross-sectional area than the most adjacent part of said inlet line, causing a pressure drop across said spool as fluid passes through said orifice from said inlet line, and said cage having a back orifice associated with said centrally open area through which fluid can flow under certain pressure conditions to said tank line, a valve element seat surrounding said back orifice, a longitudinally movable valve element associated with said seat tending to close off said back orifice tending to prevent fluid flow through it, and biasing spring means associated with said movable valve element for applying an initial, minimum resistive biasing force against said valve element tending to keep it seated in said seat;

a direct, side port leading from said inlet line to said tank, said port having a cross-sectional area substantially greater than said front orifice and being located in juxtaposition to the side of said pilot spool and being normally blocked off by said spool under the action of said biasing spring at least until the pressure in said inlet line at least equals the resistive biasing force but, as the inlet pressure increases, said pilot spool tending to allow hydraulic fluid to flow from said inlet line through said front orifice to said centrally open area through said back orifice overcoming the biasing force of said spring to said tank, upon which said spool begins to move back until it exposes said port to said inlet line, causing the relatively high pressure of said inlet line to be limited by the relatively low pressure in said tank line;

electrical means associated with said valve element for applying a supplemental resistive force to it, increasing the resistive pressure upon it over the initial, biasing spring force, further tending to keep said valve element seated, closing off any fluid flow through said back orifice;

electrical signal means associated with said electrical means for varying the amount of resistive force applied by said electrical means to said valve element, allowing the maximum allowed pressure allowed in said inlet line before its is exhausted to said tank line to be variously set by utilizing said electrical signal; and work means associated with said inlet line, which work means is caused to do desirable work at a rate set in accordance with the varying set maximum pressure levels in said inlet line, said electrical signal means effectively controlling said work means in accordance with the electrical signal produced by said electrical signal means, said work means including:

an agricultural combine;

a combine header carried by said combine;

an hydraulic circuit associated with said inlet line, said tank line and said pressure relief valve;

hydraulic lift means included in said circuit and connected to said header for moving said combine header to a vertical position off of the ground and at a speed dependent upon the hydraulic pressure existent in said inlet line, said hydraulic lift means including a gravity lowered hydraulic ram connected to said combine head; and an "on/off" control valve connected between said hydraulic ram and said inlet line controlling the hydraulic fluid pressure supplied to said ram controlling its direction and speed of movement in conjunction with said pressure relief valve, ground contour sensing means associated with said combine measuring the changing contour of the ground over which said combine travels as the combine travels over the ground and is being operatively used, said ground contour sensing means including a ski sled carried by said combine in contact with the ground; and computer means associated with said combine for interpreting the output of said ground sensing means and controlling said electrical signal means producing appropriate electrical signals to be sent to said electrical means appropriately changing the set maximum allowed pressure allowed in said inlet line, appropriately moving said combine header in response thereto.

10. A method of varying the maximum allowable line pressure in an associated fluid line in response to an electrical signal, comprising the following steps:

(a) utilizing an electrically controlled pressure relief valve system, including an inlet line for containing fluid under pressure;

a tank line leading to a fluid tank at a relatively low pressure to that normally contained in said inlet line;

a proportional, pressure relief valve located in line between said inlet line and said tank line, blocking the two off when a relatively low pressure exists in said inlet line, said pressure relief valve having a cartridge, a longitudinally extended cage held by said cartridge and associated with said inlet line, a longitudinally movably, centrally open pilot spool located within said cage and in fluid communication with said inlet line, said spool having a front orifice associated with the centrally open area of said spool and communicating with said inlet line and having a substantially smaller cross-sectional area than the most adjacent part of said inlet line, causing a pressure drop across said spool as fluid passes through said orifice from said inlet line, and said cage having a back orifice associated with said centrally open area through which fluid can flow under certain pressure conditions to said tank line, a valve element seat surrounding said back orifice, a longitudinally movable valve element associated with said seat tending to close off said back orifice tending to prevent fluid flow through it, and biasing spring means associated with said movable valve element for applying an initial, minimum resistive biasing force against said valve element tending to keep it seated in said seat;

a direct, side port leading from said inlet line to said tank, said port having a cross-sectional area substantially greater than said front orifice and being located in juxtaposition to the side of said pilot spool and being normally blocked off by said spool under the action of said biasing spring at least until the pressure in said inlet line at least equals the resistive biasing force but, as the inlet pressure increases, said pilot spool tending to allow fluid to flow from said inlet line through said front orifice to said centrally open area through said back orifice overcoming the biasing force of said spring to said tank, upon which said spool begins to move back until it exposes said port to said inlet line, causing the relatively high pressure of said inlet line to be limited by the relatively low pressure in said tank line;

electrical means associated with said valve element for applying a supplemental resistive force to it, increasing the resistive pressure upon it over the initial, biasing spring force, further tending to keep said valve element seated, closing off any fluid flow through said back orifice;

electrical signal means associated with said electrical means for varying the amount of resistive force applied by said electrical means to said valve element, allowing the maximum allowed pressure allowed in said inlet line before its is exhausted to said tank line to be variously set by utilizing said electrical signal; and work means associated with said inlet line, which work means is caused to do desirable work at a rate set in accordance with the varying set maximum pressure levels in said inlet line, said electrical signal means effectively controlling said work means in accordance with the electrical signal produced by said electrical signal means; and (b) varying the electrical signal to said electrical means to vary the maximum allowed pressure allowed in said inlet line, controlling said work means in accordance with the electrical signal produced by said electrical signal means.

11. The method of claim 10, wherein said work means comprises:

an agricultural combine;

a combine header carried by said combine;

an hydraulic circuit associated with said inlet line, said tank line and said pressure relief valve;

hydraulic lift means included in said circuit and connected to said header for moving said combine header to a vertical position off of the ground and at a speed dependent upon the hydraulic pressure existent in said inlet line;

ground contour sensing means associated with said combine measuring the changing contour of the ground over which said combine travels as the combine travels over the ground and is being operatively used; and computer means associated with said combine for interpreting the output of said ground sensing means and controlling said electrical signal means producing appropriate electrical signals to be sent to said electrical means appropriately changing the set maximum allowed pressure allowed in said inlet line, appropriately moving said combine header in response thereto; and wherein in step "b" there is included the following step(s):

utilizing said computer means to interpret the output of said ground sensing means and control said electrical signal means to send appropriate electrical signals to be sent to said electrical means appropriately changing the set maximum allowed pressure allowed in said inlet line, appropriately moving said combine header in response thereto.

* * * * *